US011364958B2

United States Patent
Takahashi et al.

(10) Patent No.: US 11,364,958 B2
(45) Date of Patent: Jun. 21, 2022

(54) VEHICLE BODY LOWER STRUCTURE

(71) Applicants: TOYOTA JIDOSHA KABUSHIKI KAISHA, Aichi (JP); SUBARU CORPORATION, Tokyo (JP)

(72) Inventors: Naoki Takahashi, Miyoshi (JP); Shin Inoue, Okazaki (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 102 days.

(21) Appl. No.: 17/019,353

(22) Filed: Sep. 14, 2020

(65) Prior Publication Data
US 2021/0094624 A1 Apr. 1, 2021

(30) Foreign Application Priority Data

Sep. 30, 2019 (JP) .............................. JP2019-180022

(51) Int. Cl.
| | | |
|---|---|---|
| B60J 7/00 | (2006.01) | |
| B62D 25/20 | (2006.01) | |
| B60K 1/04 | (2019.01) | |
| B60L 50/50 | (2019.01) | |
| B62D 25/02 | (2006.01) | |
| B62D 21/15 | (2006.01) | |
| B62D 27/06 | (2006.01) | |

(52) U.S. Cl.
CPC ............ B62D 25/2036 (2013.01); B60K 1/04 (2013.01); B60L 50/50 (2019.02); B62D 21/15 (2013.01); B62D 25/025 (2013.01); *B60K 2001/0438* (2013.01); *B62D 27/065* (2013.01)

(58) Field of Classification Search
CPC .. B62D 25/025; B62D 25/2036; B62D 25/04; B62D 21/157; B62D 25/20; B60G 5/047; B60G 5/04; F02F 7/006; F01L 13/0005; Y02E 60/50
See application file for complete search history.

(56) References Cited

U.S. PATENT DOCUMENTS

| | | | | |
|---|---|---|---|---|
| 4,493,506 | A * | 1/1985 | Alexander | ............. B60R 13/04 293/128 |
| 8,708,402 | B2 * | 4/2014 | Saeki | ................... B62D 21/157 296/187.12 |
| 9,290,208 | B2 * | 3/2016 | Kishima | ............. B60R 16/0215 |
| 9,545,952 | B2 * | 1/2017 | Sakaguchi | ........... B62D 21/157 |
| 10,040,339 | B2 * | 8/2018 | Kanagai | ................ B60J 5/0461 |

(Continued)

FOREIGN PATENT DOCUMENTS

| | | |
|---|---|---|
| JP | 2013256265 A | 12/2013 |
| JP | 201875939 A | 5/2018 |
| JP | 20196303 A | 1/2019 |

*Primary Examiner* — Kiran B Patel
(74) *Attorney, Agent, or Firm* — Hauptman Ham, LLP

(57) ABSTRACT

A vehicle body lower structure may comprise: a rocker arranged at a lower lateral part of a vehicle body and extending along a front-rear direction of the vehicle body, the rocker being hollow; a power supply package arranged under a floor panel of the vehicle body; and an energy absorbing member fixed to the power supply package and fixed to a bottom plate of the rocker. A side surface of the energy absorbing member located under the rocker may be inclined to face diagonally upward, and a drain hole may be arranged in the bottom plate at a position above the side surface.

4 Claims, 4 Drawing Sheets

(56) References Cited

U.S. PATENT DOCUMENTS

| | | | |
|---|---|---|---|
| 10,710,638 B2* | 7/2020 | Kawase | B60K 1/04 |
| 10,723,385 B2* | 7/2020 | Ayukawa | B62D 25/20 |
| 10,919,577 B2* | 2/2021 | Douglas | B62D 25/025 |
| 10,967,912 B2* | 4/2021 | Toyota | B62D 25/02 |
| 2013/0026786 A1* | 1/2013 | Saeki | B60K 1/04 |
| | | | 296/187.12 |
| 2018/0126933 A1* | 5/2018 | Kawase | B60K 1/04 |
| 2018/0312199 A1* | 11/2018 | Kawase | B62D 25/2036 |
| 2018/0370570 A1* | 12/2018 | Ayukawa | B62D 25/2036 |
| 2018/0370577 A1* | 12/2018 | Takahashi | B62D 25/2036 |
| 2019/0047633 A1* | 2/2019 | Sawai | B60K 15/03006 |
| 2019/0359260 A1* | 11/2019 | Tsuyuzaki | B60R 16/04 |
| 2020/0114973 A1* | 4/2020 | Takahashi | B62D 25/025 |
| 2021/0078638 A1* | 3/2021 | Hirota | B60K 1/04 |
| 2021/0094624 A1* | 4/2021 | Takahashi | B60L 3/0007 |
| 2021/0214012 A1* | 7/2021 | Takahashi | B62D 25/2036 |
| 2021/0221435 A1* | 7/2021 | Takahashi | B62D 25/2036 |
| 2021/0221441 A1* | 7/2021 | Takahashi | B62D 21/157 |
| 2021/0221442 A1* | 7/2021 | Takahashi | B60K 1/04 |
| 2021/0284243 A1* | 9/2021 | Takahashi | B62D 25/025 |

* cited by examiner

VEHICLE BODY LOWER STRUCTURE

CROSS-REFERENCE TO RELATED APPLICATION

This application claims priority to Japanese Patent Application No. 2019-180022 filed on Sep. 30, 2019, the contents of which are hereby incorporated by reference into the present application.

TECHNICAL FIELD

The art disclosed herein relates to a vehicle body lower structure. It relates in particular to a vehicle body lower structure in which a power supply package is disposed under a floor panel.

BACKGROUND

In some electric vehicles, a power supply package configured to supply power to a traction motor is arranged under a floor panel. The power supply package is arranged between a pair of rockers. Japanese Patent Application Publication Nos. 2018-75939 (Literature 1), 2019-6303 (Literature 2), and 2013-256265 (Literature 3) describe examples of such an electric vehicle. The pair of rockers is a frame extending along a front-rear direction of a vehicle body at lateral sides of a lower part of each vehicle body. The rockers may be sometimes referred to as "side sills". The power supply package may include a battery, a fuel cell, and the like.

In order to protect the power supply package from an impact of lateral collision from a lateral side of a vehicle body, there may be a case where a member configured to absorb impact energy (energy absorbing member) by the shock is arranged along each of the rockers. Literatures 1 and 3 describe examples of such an energy absorbing member.

In the vehicle body lower structure described in Literature 1, the power supply package is fixed to a side member. In Literature 3, the energy absorbing member is connected to the power supply package, and is fixed to a bottom plate of the rocker.

SUMMARY

The rocker is hollow, thus, water may enter inside the rocker. A consideration may be given to providing a drain hole in a bottom plate of the rocker, however, in the structure described in Literature 3, if the drain hole is provided in the bottom plate of the rocker, water will accumulate on an upper surface of the energy absorbing member. The present disclosure provides a vehicle body lower structure having a structure configured to drain water within a rocker underneath the vehicle body.

A vehicle body lower structure may comprise: a rocker arranged at a lower lateral part of a vehicle body and extending along a front-rear direction of the vehicle body, the rocker being hollow; a power supply package arranged under a floor panel of the vehicle body; and an energy absorbing member fixed to the power supply package and fixed to a bottom plate of the rocker. A side surface of the energy absorbing member located under the rocker may be inclined to face diagonally upward, and a drain hole may be arranged in the bottom plate at a position above the side surface.

To simplify the description, the side surface of the energy absorbing member that is inclined will be referred to as an inclined side surface. In the vehicle body lower structure disclosed herein, the drain hole is provided in the bottom plate of the rocker, and the inclined side surface of the energy absorbing member is located under the drain hole. Water that flowed down through the drain hole flows along the inclined side surface and is drained underneath the vehicle body. The water that has been drained from the drain hole of the rocker does not remain on the energy absorbing member. The side surface of the energy absorbing member may be inclined at least at an upper side of the side surface, and a lower side of the side surface may be oriented along a horizontal direction.

The rocker may comprise a rocker inner panel and a rocker outer panel. The rocker inner panel may be located on a center side of the vehicle body in the vehicle-width direction. The rocker outer panel may be adjacent to the rocker inner panel, and may be located outside of the inner rocker panel in the vehicle-width direction. Each of the rocker inner panel and the rocker outer panel may comprise a flange extending downward, and the flange of the rocker inner panel and the flange of the rocker outer panel may face each other. The rocker inner panel and the rocker outer panel may have their respective flanges joined to each other. In such a structure, at least one of the flanges of the rocker inner panel and the rocker outer panel may comprise a groove as a drain hole. The groove may penetrate from an upper end to a lower end of the flange. When the rocker inner panel and the rocker outer panel are joined to each other, the groove of the one flange and the other flange facing the groove may constitute a hole (drain hole). Since the drain hole that is vertically elongated is constituted by the groove, water may not enter into the rocker from below through the drain hole.

The width of the groove may be narrowed toward a lower side. The possibility of water through the drain hole from below into the rocker may be further reduced.

Details and further developments of the art disclosed herein will be described in DETAILED DESCRIPTION as below.

DETAILED DESCRIPTION

Embodiment

Figure 1:
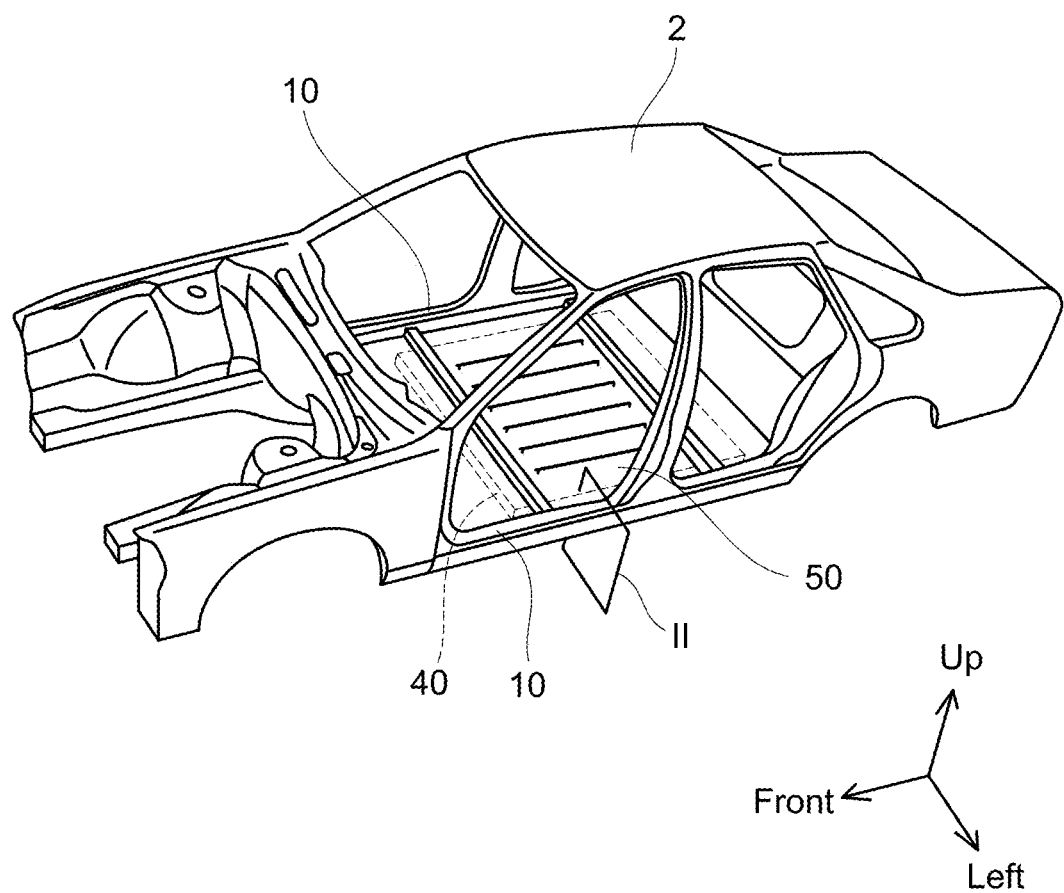
FIG. 1 illustrates a perspective view of a vehicle body.

A vehicle body lower structure 3 according to an embodiment will be described with reference to the drawings. FIG. 1 illustrates a perspective view of a vehicle body 2. "Left" in a coordinate system of FIG. 1 indicates "left" in a case of seeing a front side from a rear side of the vehicle body. The "Left" in the coordinate system has a like meaning in all of the drawings.

The vehicle body 2 comprises a pair of rockers 10. Each of the rockers 10 is arranged at a corresponding lateral side of a lower part of the vehicle body 2 in a vehicle-width (left-right) direction of the vehicle body 2. Each rocker 10 is hollow, has an elongated shape, and extends along a front-rear direction of the vehicle body. The pair of rockers 10 is one type of frames configured to secure rigidity of the vehicle body. The rockers 10 are made by extrusion molding of a metal (typically, aluminum).

A power supply package 40 and a floor panel 50 are arranged between the pair of rockers 10. The power supply package 40 incorporates a large number of battery cells therein. The battery cells are connected in series, and configured to output high-voltage power. The power supply package 40 is configured to supply the power to a traction motor (not shown). The power supply package 40 may be a collective body of fuel cells.

The floor panel 50 corresponds to a floor of a cabin. Each side of the floor panel 50 is fixed to corresponding one of the rockers 10. The power supply package 40 is arranged under the floor panel 50. Although details will be described later, an energy absorbing member (not shown in FIG. 1) is arranged along the rockers 10, and the power supply package 40 is supported by the pair of rockers 10 via the energy absorbing member. Hereafter, the energy absorbing member will be referred to as an EA member (Energy Absorbing member) for convenience of description.

Figure 2:
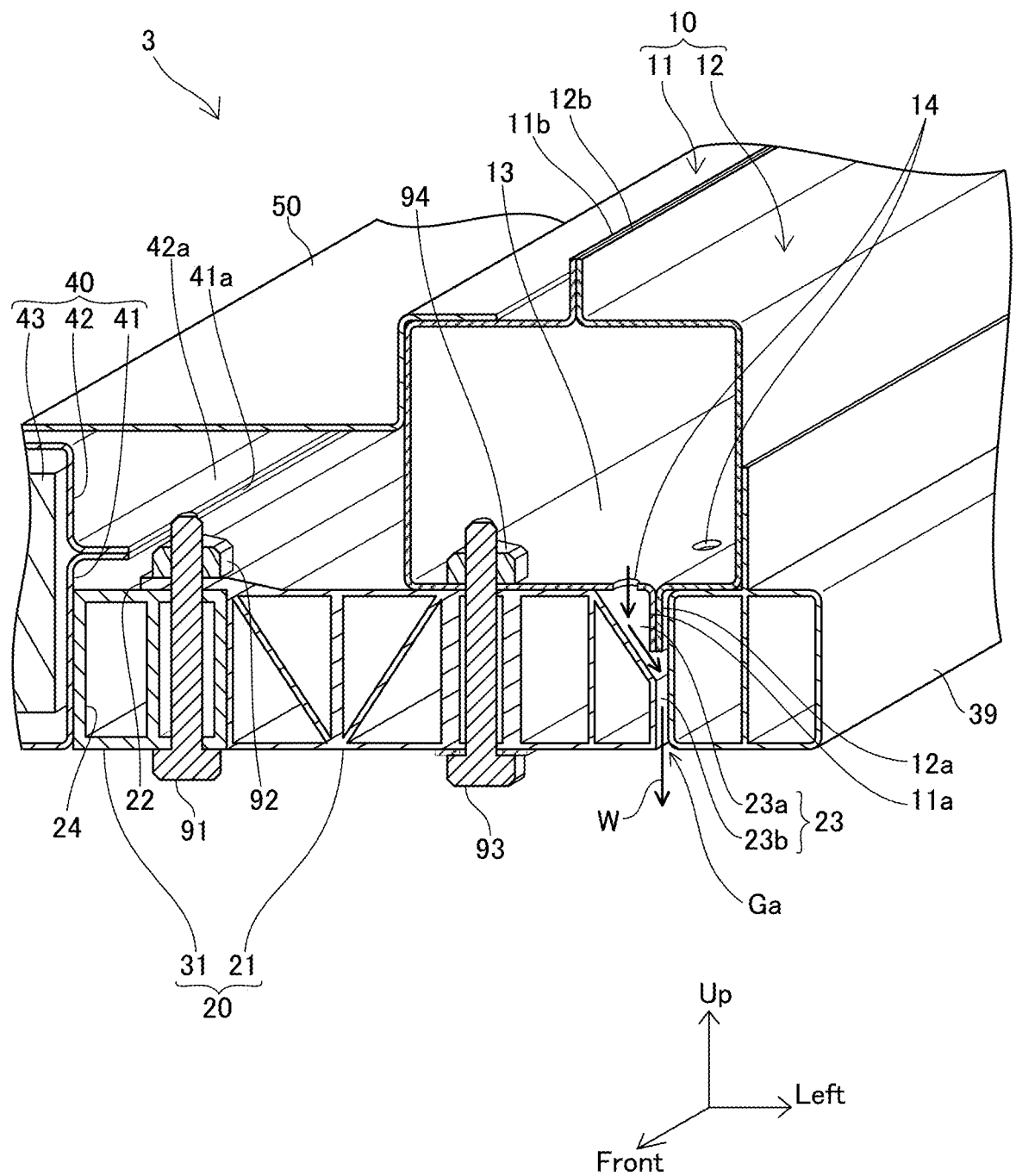
FIG. 2 illustrates a cross-sectional view of the vehicle body taken along a plane II of FIG. 1.

FIG. 2 shows a cross section of the vehicle body 2 cut along a plane 11 of FIG. 1. FIG. 2 shows the lower structure 3 on a left side of the vehicle body 2. The vehicle body 2 is symmetrical in the left-right direction, and the lower structure 3 on a right side of the vehicle body 2 has a same structure as that of FIG. 2. Accordingly, a description of the lower structure of the right side of the vehicle body 2 will be omitted.

As aforementioned, the power supply package 40 is fixed to the rockers 10 via the EA members 20 (energy absorbing members 20). The power supply package 40 is fixed to the rocker 10 via the EA member 20 on each of a right lower part and a left lower part of the vehicle body.

The power supply package 40 comprises a lower cover 41, an upper cover 42, and a plurality of battery cells 43. A container is constituted by the lower cover 41 and the upper cover 42, and the plurality of battery cells 43 is housed within the container. The lower cover 41 comprises a flange 41a and the upper cover 42 comprises a flange 42a. The lower cover 41 and the upper cover 42 are joined to each other at the flanges 41a, 42a.

The rocker 10 is constituted of an inner rocker panel 11 and an outer rocker panel 12. A flange 11a extends downward from a lower edge of the inner rocker panel 11, and a flange 12a extends downward from a lower edge of the outer rocker panel 12. A flange surface of the flange 11a is welded to a flange surface of the flange 12a. A flange 11b extends upward from an upper edge of the inner rocker panel 11, and a flange 12b extends upward from an upper edge of the outer rocker panel 12. A flange surface of the flange 11b is welded to a flange surface of the flange 12b.

Each of the rockers 10 has a hollow, cornered, and tubular shape extending along a front-rear direction of the vehicle body. A nut 94 is fixed to an inner side of a bottom plate 13 of the inner rocker panel 11. The nut 94 is welded to the inner rocker panel 11 before the inner rocker panel 11 and the outer rocker panel 12 are welded to each other. A plurality of drain holes 14 is provided in the bottom plate 13 of the inner rocker panel 11. The drain holes 14 penetrate the bottom plate 13. The drain holes 14 will be described later.

The EA member 20 is constituted of an EA member 21 and an EA member 31. The EA member 21 is disposed under the inner rocker panel 11. The EA member 31 is disposed adjacent to the EA member 21 on a vehicle body center side. A flange 22 extends from an upper end of the EA member 21 toward a center of the vehicle body. The EA member 31 is fixed to the flange 22 of the EA member 21 by a bolt 91 and a nut 92. The EA member 20 (the EA members 21, 31) has a hollow, cornered and tubular shape. In other words, the EA member 20 (the EA members 21, 31) is a hollow beam.

The power supply package 40 is fixed to a side plate 24 of each of the EA members 20 on the vehicle body center side (center side in the vehicle-width direction). In other words, the power supply package 40 is disposed between the pair of EA members 20 (pair of rockers 10). Each of the EA members 20 (EA members 21) is fastened to the bottom plate 13 of its corresponding rocker 10 (inner rocker panel 1) by a bolt 93 and the nut 94.

On each of the left and right lower parts of the vehicle body 2, the EA member 21 and the EA member 31 are connected to each other by plural bolts (including the bolt 91) aligned along the front-rear direction of the vehicle body, and the EA member 21 and the rocker 10 are connected to each other by plural bolts (including the bolt 93) aligned along the front-rear direction of the vehicle body.

The floor panel 50 covers the power supply package 40 and a part of each EA member 20 on the vehicle center side. A remaining part of each EA member 20 is located under the rocker 10. The floor panel 50 is fixed to the rockers 10 (rocker inner panel 11).

The vehicle body 2 comprises an EA member 39 in addition to the EA member 20. The EA member 39 is disposed outside of the EA member 20 in the vehicle-width direction. The EA member 39 is opposed to the EA member 20 with the lower flanges 11a, 12a of the inner rocker panel 11 and the outer rocker panel 12 interposed therebetween. The EA member 39 also has a hollow, cornered and tubular shape, similar to the EA member 20. The EA members 20, 39 are configured to absorb collision energy upon the vehicle colliding at its lateral side, and protect the power supply package 40.

The EA members 20, 39 are configured to absorb collision energy by collapsing in the vehicle-width direction by an impact of the collision. Although the rocker 10 contribute to the absorption of the collision energy, the rocker 10 alone is insufficient to absorb the collision energy all on their own. To address this, the hollow EA members 20, 39 are disposed along the rocker 10. The two EA members 20, 39 are implemented in order to secure a width of the EA members in the vehicle-width direction by avoiding the lower flanges of the inner rocker panel 11 and the outer rocker panel 12.

Strengths of the EA members 20 and 39 are determined in advance by a simulation, for example, such that the members can effectively absorb the collision energy. The strengths of the EA members 20 and 39 are set lower than at least a strength of the power supply package 40.

The cross section of the EA members 20, 39 perpendicular to the front-rear direction has a same shape at any position along the front-rear direction. The EA members 20, 39 are made by an extrusion molding method of a metal (typically aluminum).

The drain holes 14 provided in the bottom plate 13 of the rocker 10 (inner rocker panel 11) will be described. The rocker 10 is hollow, thus water may enter inside the rocker 10. The drain holes 14 are provided to drain the water inside the rocker 10 to outside thereof. A bold arrow W shown in FIG. 2 indicates how the water is drained (drain passage of water).

A side surface 23 of the EA member 20 that faces outward in the vehicle-width direction is constituted of an inclined side surface 23a on the upper side and a perpendicular side surface lower part 23b on the lower side. The side surface lower part 23b is continuous with a lower end of the inclined side surface 23a. The inclined side surface 23a faces diagonally upward and outward in the vehicle-width direction. The drain holes 14 are located above the inclined side surface 23a of the EA member 20 in a perpendicular direction. Further, a gap Ga is provided between the EA member 20 and the EA member 39. According to the aforementioned structure, the water that has been drained from the drain holes 14 flows along the inclined side surface 23a and the perpendicular side surface lower part 23b, and drips off underneath the vehicle body. Due to this, the water that has been drained from the rocker 10 does not stay on the EA member 20.

The plural drain holes 14 are aligned along the front-rear direction of the vehicle body, and all the drain holes 14 are disposed above the side surface 23 (inclined side surface 23a facing diagonally upward) of the EA member 20 in the perpendicular direction.

Figure 3:
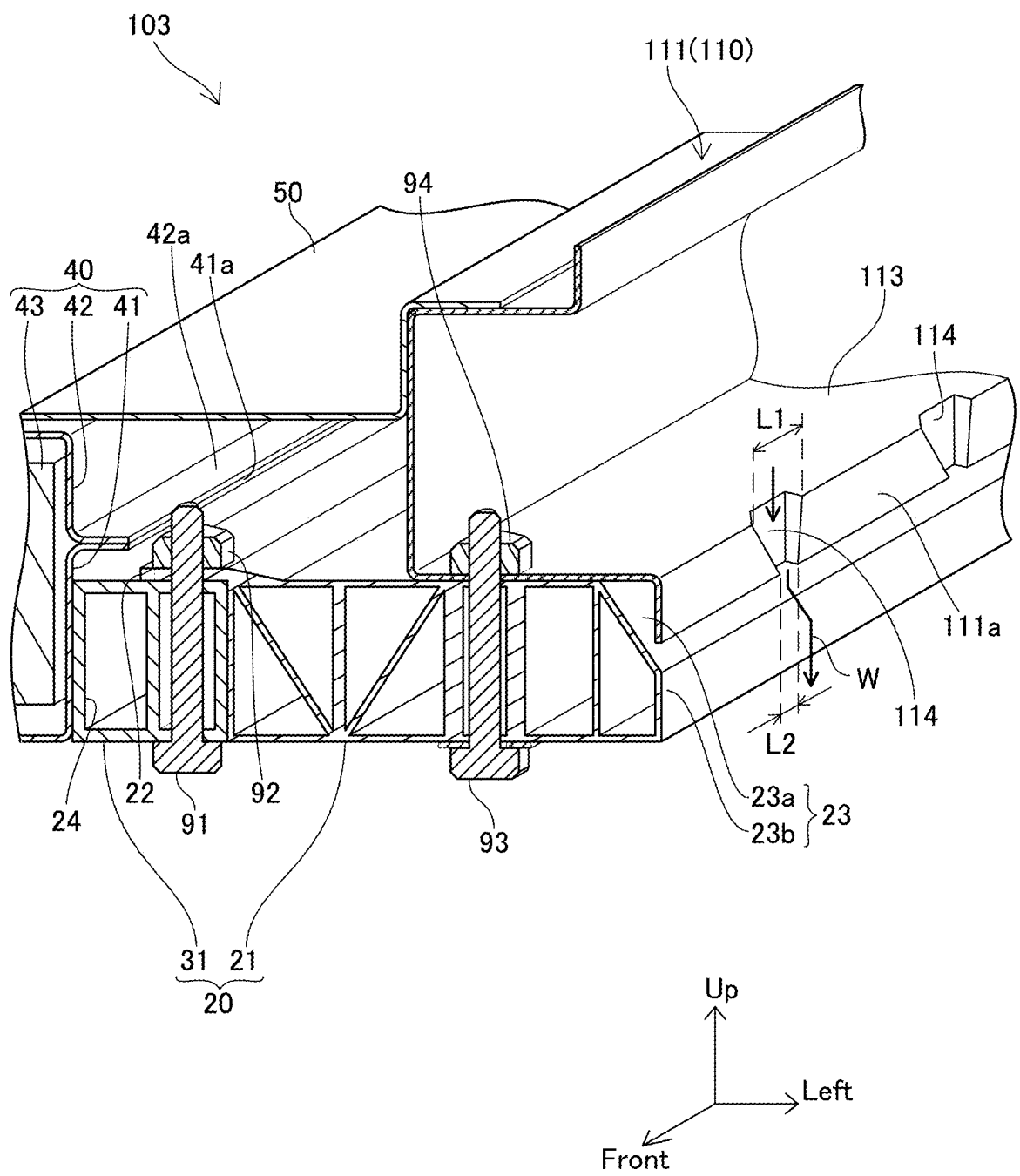
FIG. 3 illustrates a cross-sectional view showing a vehicle body lower structure according to a second embodiment.

(Second Embodiment) FIG. 3 shows a cross-sectional view of a vehicle body lower structure 103 according to a second embodiment. FIG. 3 shows a lower structure of a left side of a vehicle body. The vehicle body lower structure 103 of the second embodiment is also symmetrical in a left-right direction (vehicle-width direction) as was the vehicle body lower structure of the first embodiment, and each of EA members 20 in a pair is fixed to a corresponding one of rockers 110, and a power supply package 40 is disposed between the pair of EA members 20. Hereinbelow, the vehicle body lower structure 103, which is the lower left part of the vehicle body, will be described with reference to FIG. 3.

In the vehicle body lower structure 103 of the second embodiment, a structure of an inner rocker panel 111 is different from that of the inner rocker panel 11 in the vehicle body lower structure 3 of the first embodiment. Except for the inner rocker panel, remaining structures in the vehicle body lower structure 103 of the second embodiment are the same as those of the vehicle body lower structure 3 of the first embodiment. In FIG. 3, illustrations of an outer rocker panel 12 of the rocker 110 and an EA member 39 are omitted.

The inner rocker panel 111 comprises a flange 111a extending downward from an edge of a bottom plate 113. The flange 111a is joined to a lower flange 12a (see FIG. 2) of the outer rocker panel 12 (not shown in FIG. 3). The flange 111a is provided with grooves 114 extending from an upper end to a lower end of the flange 111a. The flange 111a is provided with the plural grooves 114 so as to be aligned along the front-rear direction of the vehicle body. When the inner rocker panel 111 and the outer rocker panel 12 (not shown in FIG. 3) have been joined, the grooves 114 will face the flange 12a (see FIG. 2) of the outer rocker panel 12 and constitute drain holes penetrating the bottom plate 113. Hereinbelow, the grooves 114 may be called drain holes 114.

Along the perpendicular direction, the grooves 114 (drain holes) are located above a side surface 23 (inclined side surface 23a) of the EA member 20 on the outer side in the vehicle-width direction. The inclined side surface 23a faces diagonally upward and outward in the vehicle-width direction, similar to the first embodiment. A lower part of the side surface 23 (side surface lower part 23b) is continuous with a lower end of the inclined side surface 23a, and extends in the perpendicular direction. As a bold arrow W indicates, water inside the rocker 110 flows down through the grooves 114 (drain holes 114) and is guided underneath the vehicle body along the side surface 23 of the EA member 20 (the inclined side surface 23a and the side surface lower part 23b). In the vehicle body lower structure 103 also, the water drained from the rocker 110 through the grooves 114 (drain holes 114) does not remain on the EA member 20.

A width L1 at an upper end of each groove 114 (drain hole 114) is wider than a width L2 of a lower end of each groove 114. The width of each groove 114 (drain hole 114) is narrowed from the upper end toward the lower end. In other words, the width of each groove 114 (drain hole 114) is narrowed toward a lower side. According to such a shape, the water easily flows downward from within the rocker 110, while it is difficult for the water to enter from under the rocker 110 into the rocker 110.

Figure 4:
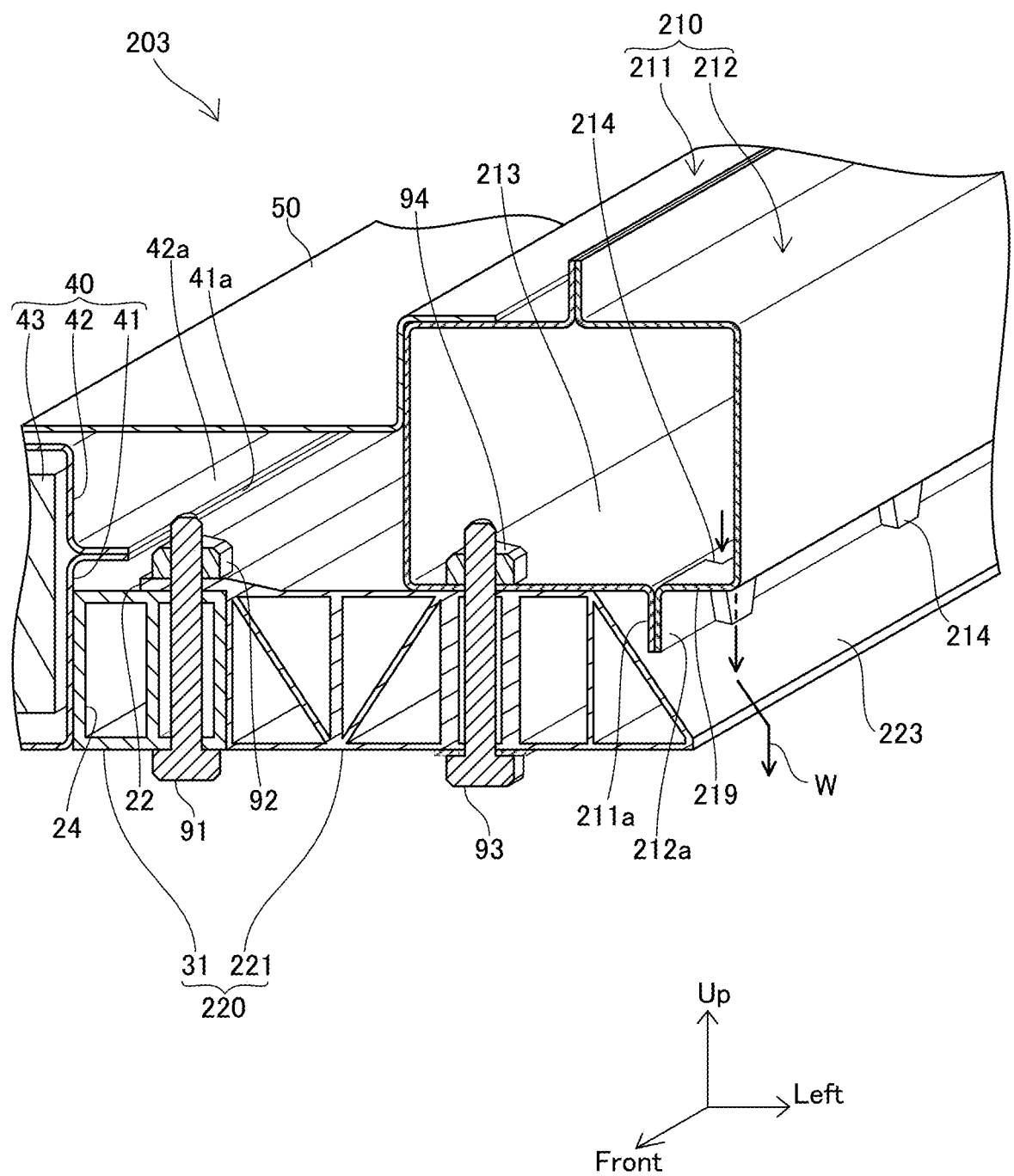
FIG. 4 illustrates a cross-sectional view showing a vehicle body lower structure according to a third embodiment.

(Third Embodiment) FIG. 4 shows a cross-sectional view of a vehicle body lower structure 203 according to a third embodiment. FIG. 4 shows a lower structure of a left part of a vehicle body. The vehicle body lower structure 203 of the third embodiment is also symmetrical in the left-right direction (vehicle-width direction) as was the vehicle body lower structure 3 of the first embodiment, and each of EA members 220 in a pair is fixed to a corresponding one of rockers 210, and a power supply package 40 is disposed between the pair of EA members 220. Hereinbelow, the vehicle body lower structure 203, which is the lower left part of the vehicle body, will be described with reference to FIG. 4.

In the vehicle body lower structure 203 of the third embodiment, structures of an inner rocker panel 211, an outer rocker panel 212, and an EA member 221 are different from those of the inner rocker panel 11, the outer rocker panel 12, and the EA member 21 of the vehicle body lower structure 3 of the first embodiment. Further, the vehicle body lower structure 203 of the third embodiment does not comprise the EA member 39 of FIG. 1.

Unlike the inner rocker panel 11 of the first embodiment, the inner rocker panel 211 does not comprise any drain holes. Instead of this, a lower flange 212a of the outer rocker panel 212 is provided with grooves 214. Hereinbelow, the grooves 214 correspond to drain holes. The grooves 214 may be called drain holes 214.

The inner rocker panel 211 comprises a flange 211a extending downward from an edge of a bottom plate 213, and the outer rocker panel 212 comprises the flange 212a extending downward from an edge of a bottom plate 219. The flange 211a and the flange 212a are joined to each other, by which the rocker 210, which is hollow, is obtained.

The grooves 214 extend from an upper end to a lower end of the flange 212a of the outer rocker panel 212. The flange 212a is provided with the plural grooves 214 such that the grooves 214 are aligned along the front-rear direction of the vehicle body. When the flange 211a of the inner rocker panel 211 and the flange 212a of the outer rocker panel 212 are joined to each other, the grooves 214 constitute the drain holes 214 penetrating the bottom plate 219.

In the perpendicular direction, the grooves 214 (drain holes) are located above an inclined side surface 223 of the EA member 220 (EA member 221) on the outer side in the vehicle-width direction. The inclined side surface 223 faces diagonally upward and outward in the vehicle-width direction. The grooves 214 (drain holes 214) are disposed to overlap the inclined side surface 223 in the perpendicular direction. As a bold arrow W indicates, water inside the rocker 210 flows down through the grooves 214 (drain holes 214), and is guided underneath the vehicle body along the inclined side surface 223 of the EA member 220. In the vehicle body lower structure 203 also, the water drained from the rocker 210 through the grooves 214 (drain holes 214) does not remain on the EA member 220.

A width of an upper end of each groove 214 (drain hole 214) is wider than a width of a lower end of each groove 214 (drain hole 214). That is, each groove 214 (drain hole 214) is narrowed toward a lower side. Such a shape makes it easier for the water to be drained downward from within the rocker 210 and difficult for the water to enter the rocker 210 from under the rocker 210.

Points to be noted with regard to the art described in the embodiment will be described. The EA members in the second and third embodiments may also be hollow beams and may be made by an extrusion molding method of a metal (typically aluminum).

The power supply package 40 of the vehicle body lower structure of the embodiment houses batteries therein. The power supply package 40 may be a device which houses fuel cells therein.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle body lower structure comprising:
   a rocker arranged at a lower lateral part of a vehicle body and extending along a front-rear direction of the vehicle body, the rocker being hollow;
   a power supply package arranged under a floor panel of the vehicle body; and
   an energy absorbing member fixed to the power supply package and fixed to a bottom plate of the rocker;
   wherein
   a side surface of the energy absorbing member located under the rocker is inclined to face diagonally upward, and
   a drain hole is arranged in the bottom plate at a position above the side surface.

2. The vehicle body lower structure of claim 1, wherein the rocker comprises a rocker inner panel and a rocker outer panel both extending along the front-rear direction, and
   the rocker inner panel and the rocker outer panel each include a flange extending downward, the flange of the rocker inner panel and the flange of the rocker outer panel being joined to each other with the flanges facing each other, and
   at least one of the flanges of the rocker inner panel and the rocker outer panel comprises a groove extending in an up-down direction, the groove corresponding to the drain hole.

3. The vehicle body lower structure of claim 2, wherein a width of the groove is narrowed toward a lower side.

4. The vehicle body lower structure of claim 1, wherein the energy absorbing member is a hollow beam.

* * * * *